United States Patent [19]

Geckeler

[11] 4,158,479
[45] Jun. 19, 1979

[54] GRADIENT FIBER

[75] Inventor: Siegfried Geckeler, Munich, Fed. Rep. of Germany

[73] Assignee: Siemens Aktiengesellschaft, Berlin & Munich, Fed. Rep. of Germany

[21] Appl. No.: 833,481

[22] Filed: Sep. 15, 1977

[30] Foreign Application Priority Data

Sep. 23, 1976 [DE] Fed. Rep. of Germany ....... 2642822

[51] Int. Cl.$^2$ .............................................. G02B 5/14
[52] U.S. Cl. .................................................. 350/96.31
[58] Field of Search ...................................... 350/96.31

[56] References Cited

U.S. PATENT DOCUMENTS

| 4,006,962 | 2/1977 | Olshansky | 350/96.31 |
| 4,033,667 | 7/1977 | Fleming, Jr. | 350/96.31 |
| 4,057,320 | 11/1977 | Marcatili | 350/96.31 |

OTHER PUBLICATIONS

Gloge et al., "Multimode Theory of Graded-Core Fibers", *The Bell Systems Technical Journal*, vol. 52, No. 9, Nov. 1973, pp. 1563–1578.

*Primary Examiner*—John K. Corbin
*Assistant Examiner*—Stewart Levy
*Attorney, Agent, or Firm*—Hill, Van Santen, Steadman, Chiara & Simpson

[57] ABSTRACT

A gradient optical fiber has an index of refraction profile according to $$n^2(r) = n_0^2(1 - 2\Delta((r/a)^\alpha - A((r/a)^\alpha - (r/a)^{2\alpha})))$$

and has decreased differences for transit times of different modes.

1 Claim, 1 Drawing Figure

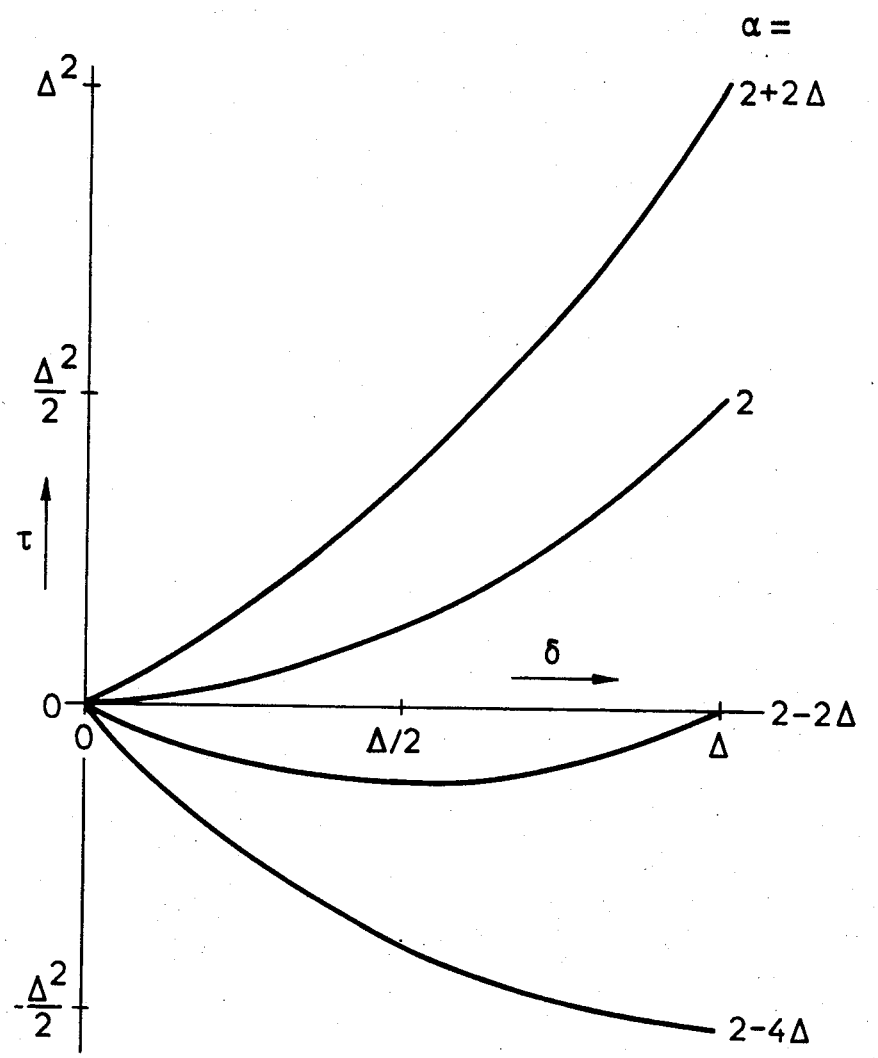

GRADIENT FIBER

BACKGROUND OF THE INVENTION

1. Field of the Invention

The present invention is directed to a gradient optical fiber.

2. Prior Art

Since optical fibers or waveguides which have a definite profile for the index of refraction can transmit information at a high rate and with a small amount of pulse widening or broadening, more and more interest is being directed to optical fibers of this type for use in optical communication transmissions.

In an article by G. Gloge and E. A. J. Marcatili, "Multimode Theory of Graded-Core Fibers", *The Bell Systems Technical Journal*, Vol. 52, No. 9, November 1973, pp. 1563–1578, gradient optical fibers were discussed. The article discloses a gradient optical fiber which has an index of refraction of a formula $$n^2_{(r)} = n_0^2(1 - 2\Delta(r/a)^\alpha)$$

wherein $n_{(r)}$ represents the index of refraction at a given radius r with the condition $0 \leq r \leq a$; $n_0$ is the maximum index of refraction at the geometric center of the fiber, $\Delta \approx n_0 - n_{(a)}/n_0$ and is the relative change of the index of refraction and $\alpha$ is an exponent characterizing the profile form. In this formula when $\alpha$ approaches $\infty$, a rectangular or stepped profile for common core cladded fiber is obtained.

The different modes that are able to expand or propagate in the fiber will have different rates of propagation. This leads to undesirable transit time differences.

In order to decrease this effect, the exponent $\alpha$ was therefore decreased so that the transit time differences between the modes are decreased. All modes are approximately equally rapid or fast when $\alpha$ is approximately 2, which occurs in a parabolic gradient fiber. The theoretic minimum for the transit time differences is obtained in accordance with the previously mentioned formula when $\alpha = 2 - 2\Delta$.

SUMMARY OF THE INVENTION

The present invention is directed to providing an improved gradient optical fiber in which the transit time differences for individual modes is minimal so that even higher transmission band widths are obtainable. For the resolution or accomplishment of this task, it is suggested that the gradient optical fiber exhibits a profile index of refraction according to the following formula $$n^2_{(r)} = n_0^2(1 - 2\Delta((r/a)^\alpha - A((r/a)^\alpha - (r/a)^{2\alpha})))$$

wherein $n_0$ equals the maximum index of refraction at the center of the fiber, $n_{(r)}$ equals the index of refraction of radius r from the center of the fiber with $0 \leq r \leq a$; $\Delta \approx n_0 - n_{(a)}/n_0$ and being the relative difference in the index of refraction of the fiber.

BRIEF DESCRIPTION OF THE DRAWING

The FIGURE shows the relationship between $\tau$ and $\delta$ for different values of $\alpha$.

DESCRIPTION OF THE PREFERRED EMBODIMENT

The principles of the present invention will produce a gradient fiber for optical transmission in which the transit time difference for individual modes will be decreased. The principles of the invention are developed from the following.

The transit time of specific modes in an optical fiber having a given length L will amount to $$t_g = L \frac{d\beta}{d\omega} = t_{g0} \cdot \frac{d\beta}{dk_0} \tag{1}$$

whereby $\beta$ is the propagation constant of this mode and suffices for the following conditions $$\beta = k_0(1 - 2\delta)^{\frac{1}{2}}; \ k_0 = (2\pi/\lambda)n_0; \ 0 \leq \delta \leq \Delta \ll 1 \tag{2}$$

where $k_0$ is the maximal wave number in the fiber.

One will obtain the following relationships for the group transit time in a fiber having a length L;

$$t_g = t_{g0}(1 - 2\delta)^{-\frac{1}{2}}(1 - 2\delta - k_0 \frac{d\delta}{dk_0}) \tag{3}$$

$$t_{g0} = L \frac{n_0}{C}(1 - \frac{\lambda}{n_0} \cdot \frac{dn_0}{d\lambda}) \approx L \frac{n_0}{C} \tag{4}$$

which will represent an exponential series for the parameter $\delta$ in the following way $$\tau(\delta) = (t_g/t_{g0}) - 1 = C_1\delta + C_2\delta^2 + C_3\delta^3 + \ldots \tag{5}$$

The coefficient $C_1$, $C_2$, $C_3$ for a given profile for an index of refraction can be determined by means of utilizing the WKB-Method, which is known from the quantum theory. For a parabolic gradient fiber, where the value of the exponent $\alpha$ deviates slightly from 2, the coefficient is $C_1 \neq 1$. However, the expression $C_1\delta$ compensates for the second expression $C_2\delta^2$ of the exponential series if the value of the exponent $\alpha$ is suitably selected.

In the FIGURE, curves for a specific value of $\alpha$ are plotted in $\tau$ versus $\delta$. When $\alpha \approx 2 - 2\Delta$, one will obtain a curve where $\tau$ will have a value of 0 for $\delta = \Delta$ and therefore a minimum transit time difference for individual modes.

However, this is only the case when the relative difference of the index of refraction $\Delta$ is independent upon the wavelength of the light. However, in practice $\Delta = \Delta(\lambda)$ so that the parameter P will be by the following formula:

$$P = -\frac{k_0}{\Delta} \cdot \frac{d\Delta}{dk_0} = \frac{1}{(1 - \frac{\lambda}{n_0}\frac{dn_0}{d\lambda})} \cdot \frac{\lambda}{\Delta} \cdot \frac{d\Delta}{d\lambda} \approx \frac{\lambda}{\Delta} \frac{d\Delta}{d\lambda}$$

and influences the optimum exponent $\alpha$. If $P \neq 0$, the coefficient becomes $C_1 = 0$ for the value $\alpha = \alpha_0 = 2 - 2P$ instead of $\alpha = 2$ so that the optimum compensation for the expression in the exponential series stated above is only obtained for the value $\alpha \approx \alpha_0 - 2\Delta$ instead of $\alpha \approx 2 - 2\Delta$. This effect is referenced profile dispersion.

When it is found out that an additional optimization of the profile of the index of refraction can be obtained under consideration of this effect if $C_1 = 0$ and the expression $C_2\delta^2$ and $C_3\delta^3$ are reciprocally compensated for so that the transit time difference of the magnitude $t_{g0}\Delta^3$ can be expected, this is facilitated by introducing additional freely selectable parameter with the aid of the following equation:

$$n^2(R) = n_0^2(1 - 2\Delta(R^\alpha - A(R^\alpha - R^{2\alpha})))$$

whereby the additional parameter is referred to as A and exhibits a value much smaller than 1. Utilizing the known WKB-Method, the following coefficients result $$C_1 = \left(\frac{\alpha - 2 + 2P}{\alpha + 2}\right)$$

$$C_2 = C_1 + \frac{1}{2} + \frac{B}{2C}$$

$$C_3 = \frac{3}{2} C_1 + 1 + \frac{(B - B^2)}{2C}$$

having the following abbreviations $$B = \frac{2}{\Delta} \cdot \frac{A}{(1-A)^2} \qquad C = \frac{(\alpha+1)(\alpha+2)}{\alpha(2-P)}$$

The optimization desired is then obtained for a value of the exponent $\alpha = \alpha_0 = 2 - 2P$ whereby the coefficient becomes $C_1 = 0$ and $C = (3 - 2P)/(1-P)$ and for the parameter A holds true:

$$A = A_{opt} \approx -\frac{C}{2} \cdot \Delta \cdot (1 + \Delta) = -\Delta \cdot (1 + \Delta) \cdot \left(\frac{\alpha_0 + 1}{\alpha_0}\right)$$

whereby it is to be taken into consideration that P and thus $\alpha_0$ are functions of the light wavelength $\lambda$. If the exponent $\alpha$ is selected in such a manner that it is equal to $\alpha_0$ for a specific wavelength $\lambda_0$, the coefficient $C_1 = (\alpha - \alpha_0)/(\alpha + 2)$ holds true only for this specific wavelength 0. For a different wavelength, $\lambda \neq \lambda_0$ and the expression $C_1 \delta$ in the above mentioned equation 5 does not disappear, as $\alpha_0(\lambda) \neq \alpha$. In order to eliminate the influence of this effect, monochromatic light of a wavelength $\lambda \approx \lambda_0$ has to be utilized.

Thus, particularly small transit time differences for the individual modes are obtained when utilizing the inventive gradient fiber with the disclosed refractive index and when utilizing monochromatic light which has a sharply defined range.

Although minor modifications might be suggested by those versed in the art, it should be understood that I wish to embody within the scope of the patent warranted hereon, all such modifications as reasonably and properly come within the scope of my contribution to the art.

I claim:

1. A gradient fiber for the transmission of optical waves, said fiber having an index of refraction profile according to $$n^2_{(r)} = n_0^2(1 - 2\Delta((r/a)^\alpha - A((r/a)^\alpha - (r/a)^{2\alpha})))$$

wherein $n_0$ = maximum index of refraction at the center of the fiber, $n_{(r)}$ = index of refraction at radius r from center of fiber with $0 \leq r \leq a$, $\Delta \approx n_0 - n_{(a)}/n_0$, $\alpha = 2 - 2P$, $$A = A_{opt} \approx -\Delta \cdot (1 + \Delta) \cdot \left(\frac{\alpha_0 + 1}{\alpha_0}\right),$$

$$P = -\frac{K_0}{\Delta} \cdot \frac{d\Delta}{dk_0} = \frac{1}{\left(1 - \frac{\lambda}{n_0} \frac{dn_0}{d\lambda}\right)} \cdot \frac{\lambda}{\Delta} \cdot \frac{d\Delta}{d\lambda} \approx \frac{\lambda}{\Delta} \cdot \frac{d\Delta}{d\lambda}.$$

and
$\lambda$ = the light wave length.

* * * * *